United States Patent [19]

Walton

[11] Patent Number: 4,886,609

[45] Date of Patent: Dec. 12, 1989

[54] METHOD FOR STIMULATION OF OIL AND GAS WELLS

[75] Inventor: William B. Walton, Cleburne, Tex.

[73] Assignee: GAF Corporation, Wayne, N.J.

[21] Appl. No.: 106,826

[22] Filed: Oct. 9, 1987

[51] Int. Cl.$^4$ ........................ E21B 37/06; E21B 43/27
[52] U.S. Cl. ............................. 252/8.552; 252/8.553
[58] Field of Search .......................... 252/8.552, 8.553

[56] References Cited

U.S. PATENT DOCUMENTS

| | | | |
|---|---|---|---|
| 2,356,254 | 8/1944 | Lehmann et al. | 252/8.552 |
| 2,674,619 | 4/1954 | Lundsted . | |
| 3,004,056 | 10/1961 | Nunn et al. . | |
| 3,402,770 | 9/1968 | Messenger | 252/8.552 |
| 3,794,523 | 2/1974 | Thompson | 252/8.552 X |
| 4,393,935 | 7/1983 | Walton | 252/8.552 X |
| 4,601,836 | 7/1986 | Jones | 252/8.553 |
| 4,676,916 | 6/1987 | Crema | 252/8.553 |

FOREIGN PATENT DOCUMENTS 2109034  5/1983  United Kingdom ............ 252/8.553

OTHER PUBLICATIONS

Morrison, R. T. and Boyd, R. N. Organic Chemistry 3rd Ed. Boston, Allyn & Bacon Inc., 1973, p. 495.

*Primary Examiner*—John F. Terapane
*Assistant Examiner*—Gary Geist
*Attorney, Agent, or Firm*—Jules E. Goldberg; Marilyn J. Maue; Joshua J. Ward

[57] ABSTRACT

A method for the removal of scale from the interior of producing oil and gas wells is disclosed. The method comprises introducing a mixture of an aqueous mineral acid, a mutual solvent, and an alkyl or aralkyl polyoxyalkylene phosphate ester to the interior of the well. The phosphate ester maintains the acid and mutual solvent in a micellar emulsion state. The mixture is retained in the well to allow the acid to solubilize the mineral deposits and then the mixture and solubilized mineral deposits are removed from the well interior.

9 Claims, 4 Drawing Sheets

METHOD FOR STIMULATION OF OIL AND GAS WELLS

BACKGROUND OF THE INVENTION

1. Field of the Invention

This invention relates to oil and gas production well stimulation. Particularly, the invention provides a method for stimulation of oil wells which are low producing or have ceased to produce.

2. Description of the Prior Art

Increasing problems with scale build-up in existing production and injection wells in the United States have and are being encountered. This scale build-up significantly interferes with the production from the producing wells and injection of water into the injection wells causing them to become low-producing wells or low injectors or in their ceasing to be producers or injectors at all. Generally, this scale is the result of calcium carbonate building up in the well bore, perforations, areas surrounding the well bore, tubing and other down-hole production equipment.

A conventional method for removing such scale formation is the so-called "acidizing" technique wherein an aqueous mineral acid or an aqueous mineral acid and a hydrocarbon solvent are introduced into the well bore. This aqueous mineral acid or an aqueous mineral acid and a hydrocarbon solvent may or may not be overflushed with sufficient produced water to move a portion of said aqueous acid or aqueous acid and hydrocarbon solvent back into the reservoir. The purpose of the acid is to dissolve or solubilize the carbonate scale build up so that it can be removed by flushing or swabbing. Normally scale and hydrocarbon co-precipitate. The hydrocarbon precipitation normally is in the form of paraffin or asphaltenes. There can also exist a situation wherein scale and hydrocarbons are precipitated in alternate layers. The scale can also become oil wet through the normal production of oil.

Methods for such fluidization are described in U.S. Pat. No. 4,541,483 wherein a non-aqueous solution of an oxyalkylated phosphate ester surfactant is introduced to a well and is thereafter displaced into the well formation utilizing either water or a hydrocarbon.

One of the problems encountered with the conventional acidizing treatment is that a short time after introduction of the acid and hydrocarbon material to the well, a separation occurs interfering with the dispersion of the acid in the hydrocarbon solvent. Thus, the distribution of the acid in the well bore is not uniform. Also, since the internal well elements including the scale are, in essence, "oil-wet", the acid cannot penetrate into the scale in order to solubilize it. Thus, the oil film on the surfaces of the elements and scale prevent direct contact with the acid. As results, such acidization treatments are relatively ineffective because of the inability of the acid component to remain in a dispersed form within the treating solution and further, its inability to attack all of the oil-wet surfaces of the interior elements of the well production equipment.

SUMMARY OF THE INVENTION

I have discovered a method for the stimulation of oil and gas wells which is highly efficient and effective in solubilizing mineral deposits within the interior of the well and facilitating their removal from the well.

More particularly, the method of the present invention comprises the steps of:

(a) first introducing to the interior of the well a mixture of an aqueous mineral acid, a mutual solvent, and an alkyl or aralkyl polyoxyalkylene phosphate ester surfactant in the free acid, alkali metal, amine or ammonium salt forms;

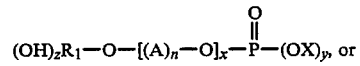

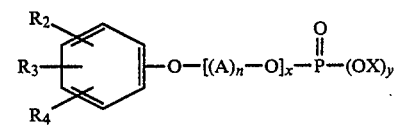

wherein $R_1$ presents an alkyl group having from 10 to 18 carbon atoms; $R_2$ represents an alkyl radical of about 5 to about 27 carbon atoms or cycloalkyl radical and radicals derived from mineral oils containing alkyl, cycloalkyl, and mixed alkyl/cycloalkyl radicals having from 12 to 27 carbon atoms; $R_3$ and $R_4$ represent either hydrogen or an alkyl having from 1 to 22 carbon atoms, and the higher alkyls defined by $R_1$ and cycloalkyls defined by $R_2$ are radicals derived from mineral oils; A represents the residue of ethylene oxide, ethylene oxide and tetrahydrofuran, or mixed lower akylene oxides selected from the group consisting of ethylene oxide, propylene oxide and butylene oxide alone or including tetrahydrofuran, wherein the total molecular weight of the ester is from about 500 to about 1,500, and where A can be heteric of block in molecular configuration; n represents the degree of oxyalkylation; x and y are 1 or 2, the sum of x and y is 3, and z is an integer of 0 to 5; X is hydrogen or a monovalent cation selected from at least one of the group consisting of an alkali metal, alkyl amine, and ammonium;

(b) retaining the mixture in the well for a period of time sufficient to allow the acid to solubilize the mineral deposits therein; and (c) removing the mixture and solubilized mineral deposits from the well interior.

The method of the present invention allows a micellar emulsion to be formed with the mineral acid. As a result of this micelle formation, the acid and solvent remain in a stable dispersion and settling does not take place during retention. Thus the solvent and phosphate ester blend is able to "de-oil" the scale and continue to form a micellar emulsion with the removed oil. Once this oil has been removed from the scale and the scale left "water wet", the ability of the acid to contact and solubilize the mineral scale deposits is further improved.

DESCRIPTION OF THE PREFERRED EMBODIMENTS

Figure 1:
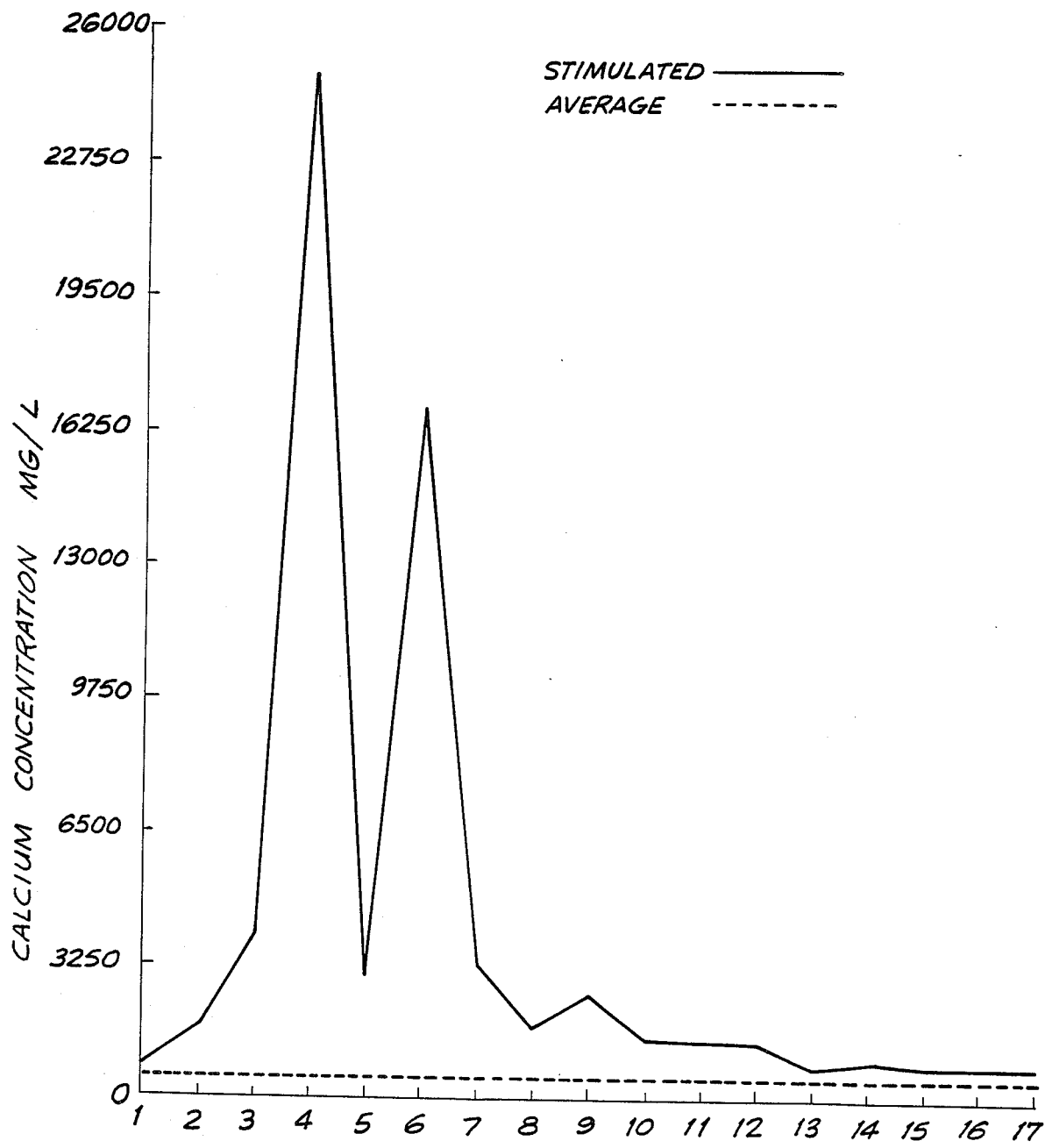
FIG. 1 is a graph showing the variation in calcium concentration with sequential swabbing of the well of Example 1.

Phosphate ester surfactants for use in the present invention are those which are useful in water-flood secondary recovery processes such as disclosed in U.S. Pat. Nos. 3,435,898, 3,596,715 and 3,480,083. Other phosphate ester surfactants which could be utilized include those based on block copolymers (propylene glycol to which propylene oxide and then ethylene oxide have been added), reverse block copolymers (ethylene glycol to which ethylene oxide and then propylene oxide have been added), tetrols (ethylene diamine to which propylene oxide and then ethylene oxide have been added) and reverse tetrols (ethylene diamine to which ethylene oxide and propylene oxide have been added).

Preferred oxyalkylated phosphate ester have the formulas:

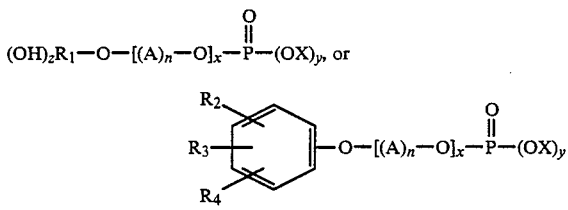

wherein $R_1$ represents an alkyl radical having 10 to 18 carbon atoms, for instance, nonyl, decyl, undecyl, dodecyl, tridecyl, tetradecyl, pentadecyl, hexadecyl, heptadecyl, octadecyl, nonadecyl, eicosyl, uneicosyl, docosyl, tricosyl, tetracosyl, pentacosyl, hexacosyl, and heptacosyl radicals. $R_2$ represents an alkyl of about 5 to 27 carbon atoms, e.g., pentyl, heptyl, hexyl, etc., higher alkyls of the same value as $R_1$, cycloalkyl, e.g., cyclopentyl, cyclohexyl, cycloheptyl, cyclooctyl, methylcyclopentyl, methylcyclohexyl, methylcyclooctyl, methylcyclobutyl, 1,1-dimethylcyclopropyl, ethylcyclopropyl, ethylcyclobutyl, 1-ethyl-2-methylcyclopropyl, 1,1,2-trimethylcyclopropyl, 1,2,3-trimethylcyclopropyl, 1,1-dimethylcyclopentyl, 1,2-dimethylcyclopentyl, 1,3-dimethylcyclopentyl, 1,2-dimethylcyclohexyl, 1,3-dimethylcyclohexyl, 1,4-dimethylcyclohexyl, ethylcyclohexyl, ethylmethylcyclopentyl, 1,1,2-trimethylcyclopentyl, cyclononyl, propylcyclohexyl, 1,2,4-trimethylcyclohexyl, 1,3,5-trimethylcyclohexyl, 1-isopropyl-4-methylcyclohexyl, 1,2,4,5-tetramethylcyclohexyl, and radicals derived from mineral oils containing alkyl, cycloalkyl and mixed alkylcycloalkyl radicals having from about 12 to 27 carbon atoms. $R_3$ and $R_4$ represent either hydrogen, alkyl of from about 1 to 22 carbon atoms, e.g., methyl ethyl, propyl, butyl, and the higher alkyls defined by $R_1$ and cycloalkyls defined by $R_2$ or radicals derived from mineral oils. A represents the residue of ethylene oxide, ethylene oxide and tetrahydrofuran, or mixed lower alkylene oxides selected from the group consisting of ethylene oxide, propylene oxide, and butylene oxide alone or including tetrahydrofuran, wherein the total molecular weight of said ester is about 500 to about 1,500, preferably about 600 to about 1,200, and wherein A can be heteric or block in molecular configuration. The degree of oxyalkylation is represented by n, x and y are 1 or 2, the sum of x and y is 3, and z is an integer of 0 to 5; X is hydrogen or a monovalent cation selected from the group consisting of at least one of an alkali metal, alkyl amine and ammonium. In the formation of the polyhydroxyl oxyalkylene polymer, at least one alkylene oxide or tetrahydrofuran is utilized. Preferably at least 2 alkylene oxides or tetrahydrofuran and one alkylene oxide are utilized. In the formation of said phosphate ester surfactants, alkyl or aralkyl alcohols can be reacted with alkylene oxides in accordance with well known prior art procedures.

The phosphorus acid reactants with which the polyhydroxy oxyalkylene compounds are reacted in the formation of the phosphate esters of the invention can be selected from the group consisting of at least one of phosphorus pentoxide, and polyphosphoric acid. Where the polyhydroxy oxyalkylated compounds are derived from mixtures of lower alkylene oxides or tetrahydrofuran, it is preferred that the compounds be mixtures of ethylene oxide and propylene oxide and that where block or heteric copolymers of these alkylene oxides are formed, it is preferred that the proportion of ethylene oxide be about ten to about ninety percent by weight and the proportion of propylene oxide be about ninety percent to about ten percent by weight. These surfactants can be utilized in the form of mono-, di- and mixed mono- and diphosphate esters. Where the surfactants are utilized in the free acid form, the monoesters are characterized by the formulas above in which X is hydrogen. The surfactants are generally available in anhydrous form or may be prepared to be substantially anhydrous. However, a minor amount of water, generally less than about ten weight percent based on surfactant, may be present and is permissable in the practice of the invention.

Typical block copolymers include mixed mono- and diphosphate esters of a block copolymer having from about 0 to 90, preferably from about 73 to 85 weight percent ethylene oxide and from about 0 to 30, preferably from about 15 to 27 weight percent propylene oxide, initiated under an aliphatic alcohol having from 10 to 16 carbon atoms and having a molecular weight from about 900 to 1,000 (90% solids in water).

In addition, phosphate esters can be used which are the reaction products of the above-described phosphorus acid reactants with the following diols or tetrols:

1. POLYOL DIOLS

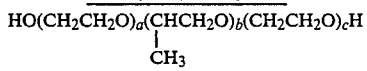

The subscripts a, b, and c are integers and are chosen to fulfill the molecular ranges described below. These compounds are prepared by adding propylene oxide to the two hydroxyl groups of a propylene glycol nucleus with a molecular weight range from about 950 to 4,000. Ethylene oxide is then added to this base to give a molecular weight range of from about 1,100 to 14,000.

2. REVERSE POLYOL DIOLS

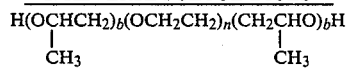

The subscripts b and n are integers and are chosen to fulfill the molecular ranges described below. These compounds are prepared by the sequential addition of ethylene and then propylene oxide to an ethylene glycol base. The molecular weight range of the base is from about 1,000 to 3,100 with a total molecular weight range of from about 1,950 to 9,000.

3. POLYOL TETROLS

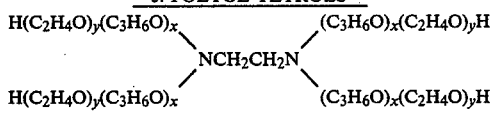

The subscripts x and y are integers and are chosen to fulfill the molecular ranges described below. These compounds are prepared by the addition of propylene and then ethylene oxide to an ethylenediamine base with a molecular weight range of from about 1,650 to about 26,000.

4. REVERSE POLYOL TETROLS

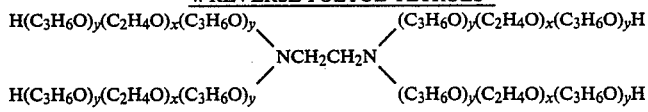

The subscripts x and y are integers and are chosen to fulfill the molecular ranges described below. These can be prepared by the addition of ethylene and then propylene oxide to an ethylenediamine base with a molecular weight range of from about 2,700 to 16,000.

Mutual solvents for use in connection with the invention include those conventional organic solvents which can be either oil or water soluble or blends of each. Typically, this would include a blend of aliphatic and aromatic solvents, and could include alcohols, such as, for example, aliphatic alcohols, glycols, polyglycols and glycol esters as well as mixtures thereof. The alcohols include methanol, ethanol, propanol, isopropanol, 1-butanol, 2-butanol, 1-pentanol, 2-pentanol, 3-pentanol, 1-hexanol, 2-ethylhexanol, 1-heptanol, 2-heptanol, 3-heptanol, 1-n-octanol, 2-n-octanol, nonyl alcohol, 1-decanol and tridecyl alcohol. The solvents further include aromatic hydrocarbon solvents, such as, benzene, toluene, xylene and the like. In general, the solvent or solvent mixture selected will be capable of dissolving from 5 to 50 weight percent of the particular oxyalkylated phosphate ester employed.

Acids suitable for use in the procedure of the present invention include mineral acids such as hydrochloric acid, hydrofluoric acid or blends of the two. The acids suitable for use may also include organic acids like acetic acid or blends of acetic acid and hydrochloric acid.

The amount of mutual solvent and phosphate ester utilized in the solvent blend of the invention can vary widely depending on the particular well situation encountered. It is only necessary that a hydrocarbon dispersing-effective amount of each of the ingredients be used and that the amount of ester utilized be sufficient to maintain the solvent and acid in a dispersed or micellar emulsion state. Generally, however, the amount of ester used is in the range from about 10% to 25%, preferably from about 12% to about 18% and most preferably from about 12% to about 15%. The amount of mutual solvent used in is the range of from about 75% to about 90%, preferably from about 72% to about 88% and most preferably from about 85% to about 88%. The ester and mutual solvent blend are generally blended at a chemical plant located off-site of the well location. The mutual solvent/phosphate ester blend is added to the tank truck of acid generally at the well site location.

The amount of acid used is generally from about 60% to about 95%, preferably from about 75% to about 90% and most preferably from about 80% to about 85%. The acid may be either 15%, 20% or 28% hydrochloric acid as well as a blend of hydrochloric acid with hydrofluoric acid or acetic acid. The acid is usually inhibited with propargyl alcohol or some other standard acid corrosion inhibitor. Usually 10 pounds of either citric acid or erythrobic acid per 1,000 gallons of hydrochloric acid is added as an iron chelate. All amounts are expressed as percent by weight unless otherwise indicated.

The following examples illustrate the invention:

Example 1

A production well in Wyoming which had exhibited a decrease in production was stimulated using the method of the present invention. A blend of the following components was prepared:

| COMPONENT | % BY WEIGHT |
|---|---|
| PHOSPHATE ESTER | 15.00 |
| CAPRYL ALCOHOL | 7.77 |
| METHANOL | 17.07 |
| ISOPROPYL ALCOHOL | 33.37 |
| XYLENE | 26.79 |

The phosphate ester/mutual solvent blend was then blended with the 28 percent hydrochloric acid solution in the ratio of 83.3%/16.7%. 150 gallons of this blend were pumped into the well as a pre-soak and allowed to remain in the well overnight (roughly 15 hours). The next morning, the phosphate ester/mutual solvent was blended with the 15 percent hydrochloric acid solution in the ratio of 15.25%/84.75%. 1,180 gallons of this solution were pumped into the perforations with the aid of a selective acidizing tool. The acid was allowed to remain in the perforations for a period of 4 hours before it was swabbed back. The phosphate ester was a mixed mono- and diphosphate ester of a block copolymer of about 75 percent by weight ethylene oxide and about 25 percent by weight propylene oxide initiated with a 10 to 16 carbon aliphatic alcohol and having a molecular weight of about 980 (90 percent solids in water).

After this period of time, the well was swabbed to remove the mixture from the well bore. Each swab represents 6 barrels of liquid. TABLE I shows the analysis of the returned fluid swabbed from the well after the contact.

TABLE I

| RESULTS OF THE RETURNED FLUID ANALYSIS | | | |
|---|---|---|---|
| SWAB | CALCIUM CONC. MG/L | pH | ACIDITY % HCL |
| 1 | 780 | 0.4 | 14.7 |
| 2 | 1,790 | 0.1 | 16.5 |
| 3 | 3,900 | 0.9 | 1.9 |
| 4 | 25,000 | 0.4 | 3.3 |
| 5 | 3,030 | 6.0 | 0 |
| 6 | 16,700 | 1.5 | 0.3 |
| 7 | 3,330 | 6.5 | 0.1 |

TABLE I-continued

| | RESULTS OF THE RETURNED FLUID ANALYSIS | | |
|---|---|---|---|
| SWAB | CALCIUM CONC. MG/L | pH | ACIDITY % HCL |
| 8 | 1,780 | 6.8 | 0 |
| 9 | 2,590 | 6.6 | 0 |
| 10 | 1,500 | 6.4 | 0 |
| 11 | 1,400 | 6.8 | 0 |
| 12 | 1,420 | 7.0 | 0 |
| 13 | 840 | 6.9 | 0 |
| 14 | 950 | 7.6 | 0 |
| 15 | 840 | 7.1 | 0 |
| 16 | 810 | 7.2 | 0 |
| 17 | 840 | 7.4 | 0 |

As shown in TABLE I, the calcium concentration which represents removed calcium carbonate increased significantly up through Swab #6 and thereafter continued to decrease down to a constant value of about 800 mg/liter. At the same time the pH of the returned solution increased from an initial, highly acidic value of 0.4 up to a value in the range of from 7.2 to 7.4. This, along with the acidity of the solution as expressed in the percent of hydrochloric acid therein, shows that the acid had been spent and the scale had been removed.

Thereafter, the well was put back into production and exhibited a significant increase in oil and water production. The production history for the year 1986 and the first two months of 1987 for this well is set forth in TABLE II.

TABLE II

| PRODUCTION HISTORY FOR 1986 AND 1987 | | | |
|---|---|---|---|
| MONTH | BOPD | BWPD | BTFPD |
| JANUARY | 4 | 96 | 100 |
| FEBRUARY | 3 | 75 | 78 |
| MARCH | 3 | 73 | 76 |
| APRIL | 10 | 76 | 86 |
| MAY | 8 | 70 | 78 |
| JUNE | 8 | 65 | 73 |
| JULY | 37 | 195 | 232 |
| AUGUST | 38 | 165 | 103 |
| SEPTEMBER | 38 | 144 | 182 |
| OCTOBER | 34 | 153 | 187 |
| NOVEMBER | 35 | 157 | 192 |
| DECEMBER | 30 | 144 | 175 |
| JANUARY | 30 | 129 | 159 |
| FEBRUARY | 25 | 141 | 166 |

The stimulation described in this example took place in June, 1986. As shown in TABLE II, a significant increase in production occurred after the stimulation. Moreover, the increased level of production continued for the eight months following the stimulation.

Figure 2:
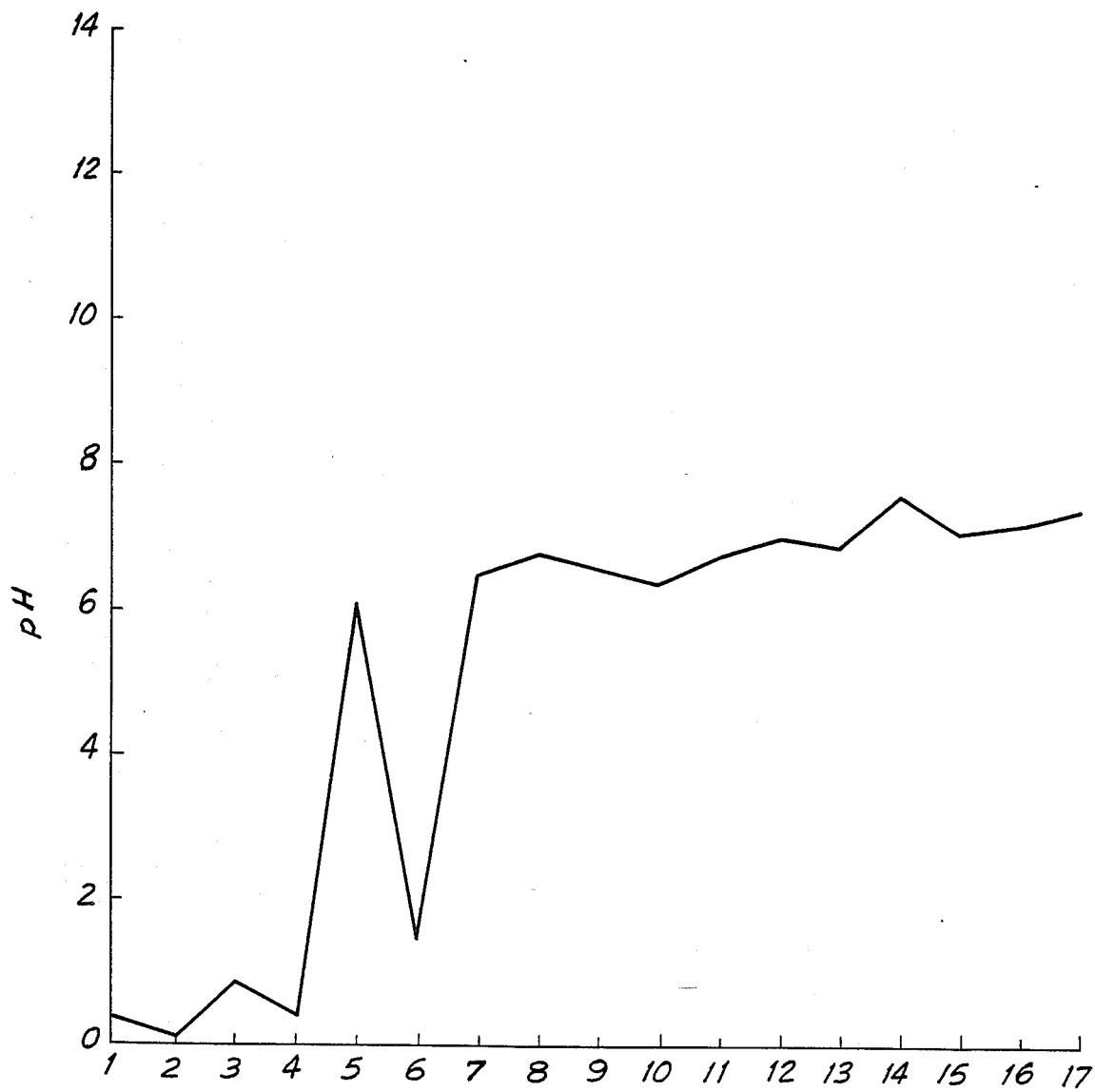
FIG. 2 is a graphical representation showing the variation in the pH of the swab fluid with sequential swabbing of the well of Example 1.
Figure 3:
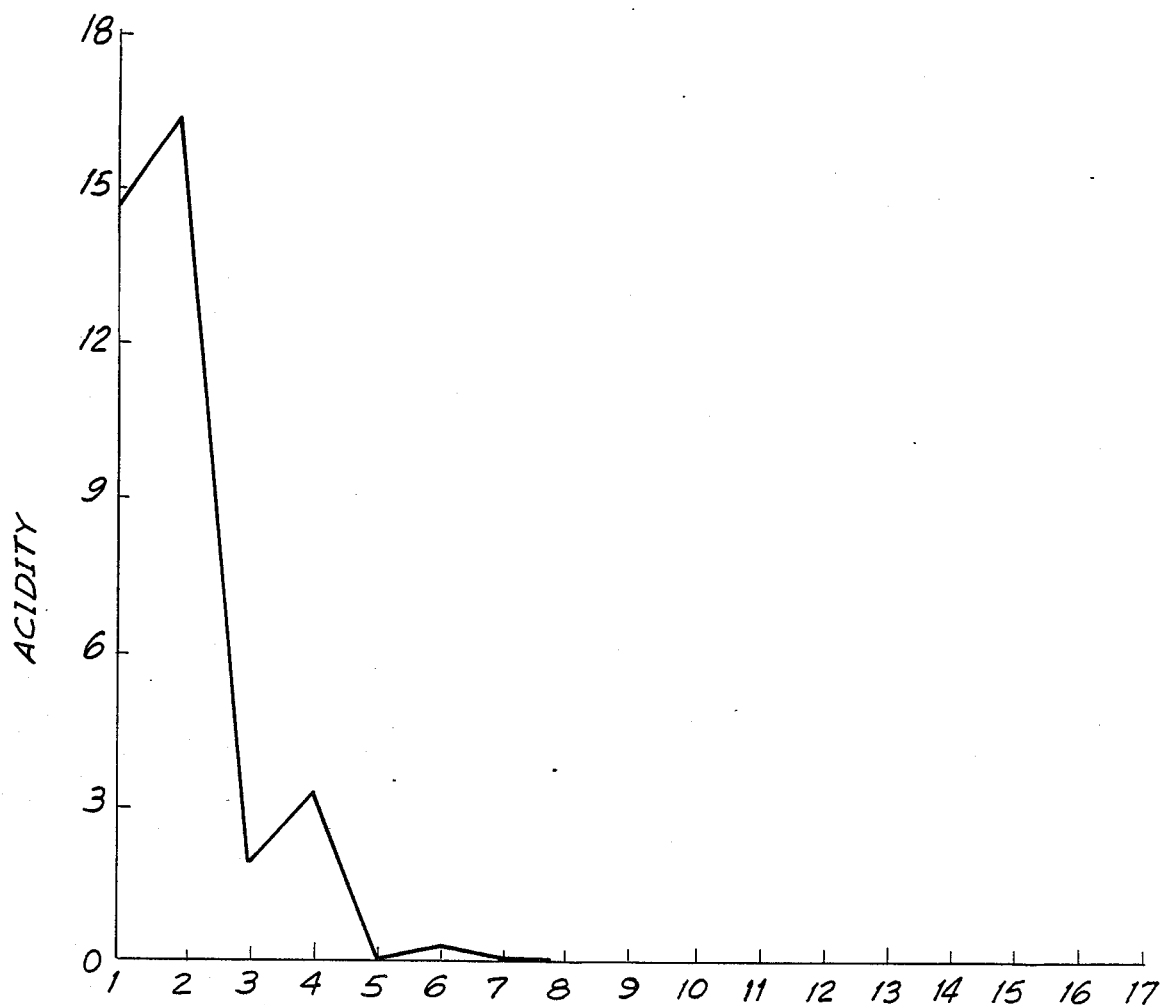
FIG. 3 is a graph showing the variation in the acidity of the swab fluid with sequential swabbing of the well of Example 1.
Figure 4:
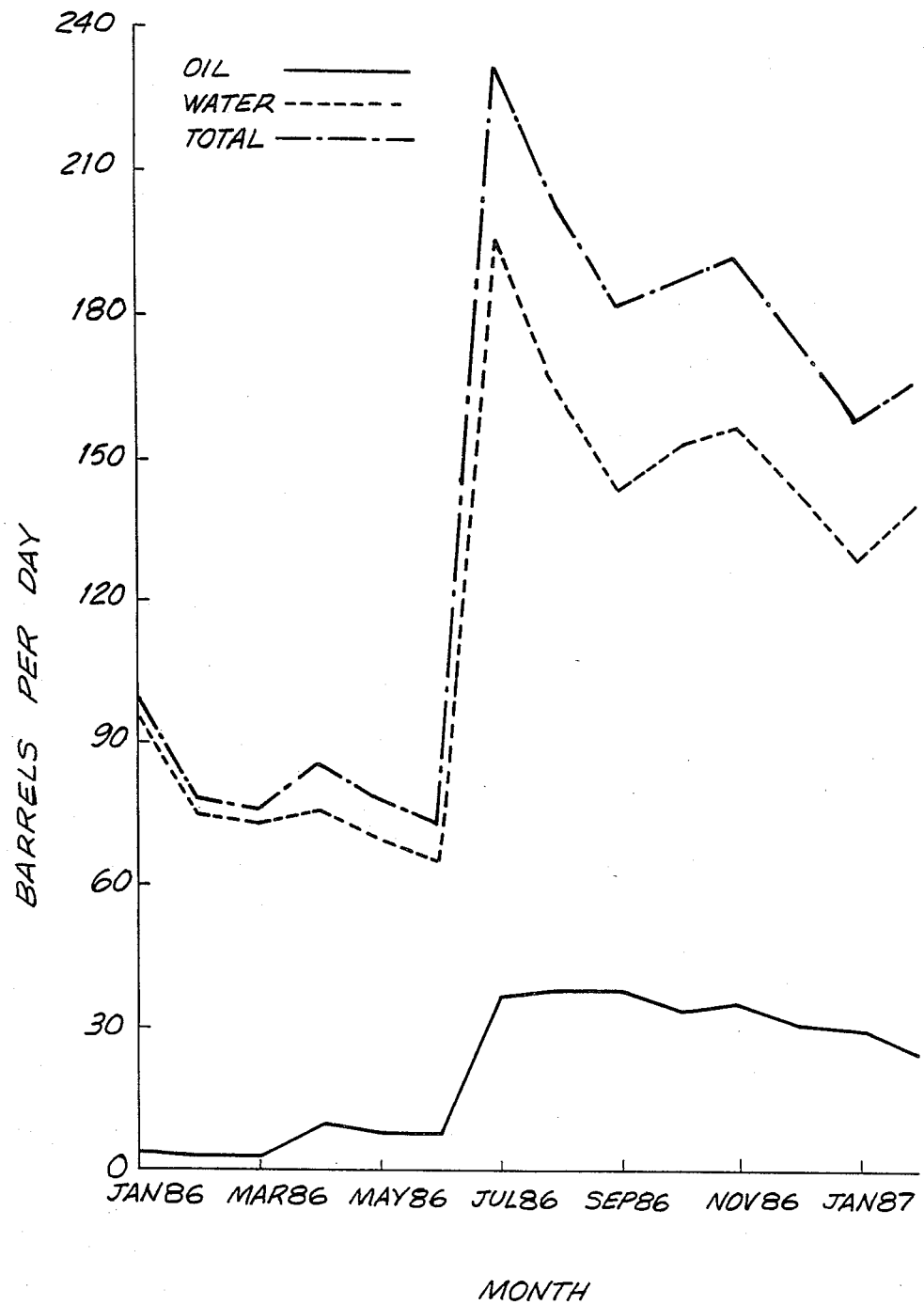
FIG. 4 is a graph showing the oil, water and total production from the well of Example 1 treated in accordance with the present invention over a period of 14 months.

As shown in FIG. 1, the variation in calcium concentration in the returned fluid is depicted graphically. Similarly, the pH variation and the acidity as percent hydrochloric acid are shown in FIGS. 2 and 3 respectively. FIG. 4 depicts graphically the increase in oil, water, and total fluid production. As shown, the stimulation of the well resulted in a significant increase in the production.

Example 2

An injection well in Wyoming was treated with a solvent pre-wash followed by stimulation in accordance with the present invention. It was the intended purpose to increase the injectivity of the well which was injecting 450 barrels of water per day at approximately 750 psi. to a desired rate of 3,700 barrels of water per day. The well was swabbed at a low rate and exhibited a 50 percent oil cut during the initial completion in November 1986 (the 50 percent of the swab was oil). It was thought that the low injectivity resulted from the high oil saturation and low relative permeability relative to water. This conclusion was supported by the relatively low mobility of 0.6 md/ct. calculated from a pressure fall-off test performed between Dec. 6, 1986, and Dec. 8, 1986. The test also indicated a negative skin value of −3.1.

The injection well was treated on Dec. 18, 1986, and immediately following the treatment, the injection rate significantly improved to 800 barrels of water per day. As of May 10, 1987, the injection rate was 900 barrels of water per day at 750 psi. and offset oil production increased by 54 barrels per day.

The tubing and packing were pulled out of the hole and 1,000 gallons of a mixture of a mutual solvent and phosphate ester was allowed to soak in the well overnight.

A packer was run into the hole and set at 3,700 feet. The well was then acidized with 5,940 gallons of a 15 percent solution of hydorchloric acid and 660 gallons of a mutual solvent/phosphate ester mixture for a total of 6,600 gallons. The acid was pumped in six 1,000-gallon stages using ten barrel-gel plugs between the stages for a total of five plugs. This was pumped at a rate of three to four barrels per minute with a maximum surface pressure of 2,500 psi.

Thereafter, the well was swabbed for cleanup and after cleanup, injection was initiated again for this well.

What is claimed is:

1. A method for the removal of scale from the interior of producing oil and gas wells comprising the steps of:
   (a) preparing a first mixture of an alkyl or aralkyl polyoxylene phosphate ester and a mutual solvent obtained by blending of a water soluble alcohol selected from the group consisting of methanol, ethanol, propanol and isopropanol, and an aromatic hydrocarbon, the phosphate ester having the formula

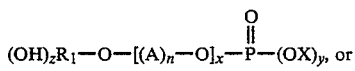

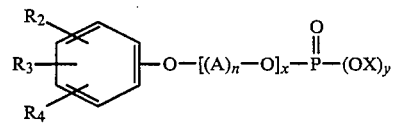

wherein:

R$_1$ represents an alkyl radical having 10 to 18 carbon atoms;

R$_2$ represents an alkyl of about 5 to 27 carbon atoms, cycloalkyl, and radicals derived from mineral oils containing alkyl, cycloalkyl and mixed alkylcycloalkyl radicals having from about 12 to 27 carbon atoms;

R$_3$ and R$_4$ represent hydrogen, alkyl having from about 1 to 22 carbon atoms, cycloalkyl, and radicals derived from mineral oils containing alkyl, cycloalkyl and mixed alkylcycloalkyl radicals having from about 12 to 27 carbon atoms;

A represents the residue of ethylene oxide, ethylene oxide and tetrahydrofuran, or mixed lower alkylene oxides selected from the group consisting of ethylene oxide, propylene oxide, and butylene oxide alone or including tetrahydrofuran;

and wherein the total molecular weight of the ester is about 500 to about 1,500, and A is heteric or block in molecular configuration; and wherein the degree of oxyalkylation is represented by n; x and y are 1 or 2; the sum of x and y is 3; z is an integer from 0 to 5; and X is hydrogen or a monovalent cation selected from the group consisting of an alkali metals; alkyl amines and ammonium;

(b) preparing a second mixture by admixing a mineral acid to said first mixture to form a micellar emulsion thereof wherein the acid is present in a scale deposit effective dissolving amount and the phosphorate ester is present in an amount sufficient to maintain the acid and mutual solvent in said micellar emulsion state;

(c) introducing the second mixture to a well;

(d) retaining the mixture in the well for a period of time sufficient to allow the acid to solubilize the mineral deposits therein; and (e) removing the mixture and solubilized mineral deposits from the well interior.

2. The method of claim 1 wherein the amount of phosphate ester is in the range from about 10 to 25 percent by weight based on the total weight of the solvent and ester.

3. The method of claim 2 wherein the amount of phosphate ester is in the range from about 12 to 18 percent by weight based on the total weight of the solvent and ester.

4. The method of claim 1 wherein the amount of mutual solvent is in the range from about 75 to 90 percent by weight based on the total weight of the solvent and ester.

5. The method of claim 1 wherein the amount of mutual solvent is in the range from about 72 to about 88 percent by weight based on the total weight of the solvent and ester.

6. The method of claim 1 wherein the amount of acid used is in the range from about 60 to about 95 percent by weight and the acid has a concentration from about 15 to about 28 percent mineral acid.

7. The method of claim 6 wherein the acid is selected from the group consisting of hydrochloric acid and blends of hydrochloric acid with hydrofluoric acid or acetic acid.

8. The method of claim 1 wherein the phosphate ester surfactant is selected from the group consisting of block copolymers of propylene glycol to which propylene oxide and then ethylene oxide have been added; reverse block copolymers of ethylene glycol to which ethylene oxide and then propylene oxide have been added, tetrols of ethylenediamine to which propylene oxide and then ethylene oxide have been added, and reverse tetrols of ethylenediamine to which ethylene oxide and then propylene oxide have been added.

9. The process of claim 1 wherein the phosphate ester is selected from the group consisting of the reaction products of a phosphorus acid reactant with a diol or tetrol selected from the group consisting of:

polyol diols having the formula

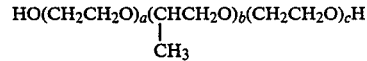

wherein a, b, and c are integers chosen so that the molecular weight of the diol is from about 1,100 to 14,000;

reverse polyol diols having the formula

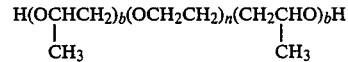

wherein b and n are chosen so that the molecular weight of the diol is from about 1,950 to 9,000;

polyol tetrols having the formula

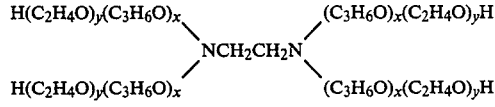

wherein x and y are chosen so that the tetrol has a molecular weight from about 1,650 to about 26,000; and reverse polyol tetrols having the formula

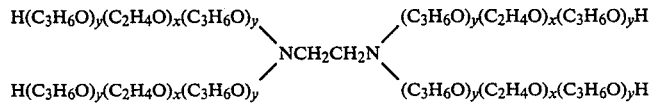

wherein x and y such that the tetrol has a molecular weight range of from about 2,700 to 16,000.

* * * * *